United States Patent
Hudson et al.

[11] Patent Number: 5,538,531
[45] Date of Patent: Jul. 23, 1996

[54] CONTROLLED RELEASE FERTILIZERS AND METHODS OF PRODUCTION

[76] Inventors: Alice P. Hudson, 328 W. 11th St., Riviera Beach, Fla. 33404; Fred E. Woodward, deceased, late of Westfield, N.J.; by Louis Robinson, legal representative, 231 Royal Palmway Ste. 302, Palm Beach, Fla. 33480

[21] Appl. No.: 177,910

[22] Filed: Jan. 6, 1994

Related U.S. Application Data

[63] Continuation-in-part of Ser. No. 719,975, Jun. 24, 1991, abandoned.

[51] Int. Cl.⁶ ............................................. C05C 9/00
[52] U.S. Cl. ........................ 71/28; 71/64.07; 71/64.11; 71/64.13
[58] Field of Search ................ 71/64.07, 28, 64.11, 71/64.12, 64.13, 904

[56] References Cited

U.S. PATENT DOCUMENTS

| | | | |
|---|---|---|---|
| 3,223,518 | 12/1965 | Hansen | 71/64.07 |
| 4,042,366 | 8/1977 | Fersch et al. | 71/29 |
| 4,772,490 | 9/1988 | Kogler et al. | 71/64.07 |

*Primary Examiner*—Ferris Lander

[57] ABSTRACT

Controlled release, particulate fertilizer products having a water soluble fertilizer central mass encased in a plurality of water insoluble, abrasion resistant coatings plus unique coating compositions and methods for the production of such products are disclosed. At least one essential inner coating is a urethane reaction product of (1) a polyisocyanate selected from diphenylmethane diisocyanate, toluene diisocyanate, derivatives thereof, polymers thereof and mixtures thereof which contain about 1.5 to 3 isocyannate groups per molecule and between about 10 and 50% NCO, and (2) a polyol having about 2 to 6 hydroxyl moieties and at least one alkyl moiety containing about 10 to 22 carbon atoms, e.g. hydrogenated castor oil. An essential outer coating is formed of an organic wax having a drop melting point of between about 50° and 120° C.

18 Claims, No Drawings

5,538,531

CONTROLLED RELEASE FERTILIZERS AND METHODS OF PRODUCTION

This application is a continuation in part of Ser. No. 07/719,975, Filed Jun. 24, 1991, now abandoned

BACKGROUND OF THE INVENTION

1. Field of the Invention

This application relates broadly to plant food particles and to methods and compositions for their production. More particularly, it concerns controlled release, particulate fertilizer products comprising a water soluble fertilizer core encased in a plurality of water insoluble, abrasion resistant coatings and unique coating compositions and methods for the production of such products.

2. Description of the Prior Art

Commercial particulate fertilizers are produced and marketed in several different particle types, i.e., granular, pelletized and prilled fertilizers. Also they may be formed of inorganic substances, organic substances, or combinations thereof. The improvements of this invention can be applied to any of these.

To be effective in promoting plant growth, fertilizers must contain some amount of water soluble plant nutrients, typically in the form of water soluble compounds of nitrogen, phosphorus and potassium, alone or in combination, and often in conjunction with other elements, e.g., calcium, boron, magnesium, zinc, chlorine, etc. Such particulate fertilizers can be made of a single component, e.g., urea, ammonium nitrate, potassium chloride, etc., or of multiple components often mixed with inert water soluble or water insoluble materials as in common fertilizers designated 6-6-6, 4-6-4, 10-10-10, 20-20-5, 14-16-0, 5-20-20 and the like. In addition, specialized fertilizers may contain optional additives such as herbicides, insecticides, trace elements, iron salts, etc. The improvements of this invention can be applied to any of these.

Historically, particulate fertilizers possessed a number of known defects, the most notable being the rapid release of soluble plant food, causing phytotoxicity and the rapid depletion of the nutrients by leaching. Other problems included tendencies to cake and form dust. These problems are well documented in prior art patents that professed solutions to one or more of the know defects including U.S. Pat. Nos. 3,475,154; 3,259,482; 3,263,088; 3,264,089; 4,711,659 & 4,772,490 and Japanese patent 52-38361. The present invention provides further improvements in the construction of particulate fertilizers that render them highly attrition resistant and noteworthy in extended release properties.

A number of slow release coatings for particulate fertilizers have been proposed. The process of sulphur coating urea particles is described in U.S. Pat. No. 3,342,577 and was developed in 1968 by the Tennessee Valley Authority (TVA) as an economical system for reducing the rate of dissolution when urea particles are applied to the soil as fertilizer. This process requires high levels of sulfur, which reduces the nutrient analysis of the fertilizer particles, and even then imperfections remain in the coating making it necessary to apply a sealant coating composed of a mixture of 30% polyethylene resin in 70% bright stock mineral oil.

Coatings in which preformed polymer resins are applied from solvents have been proposed in, for example, U.S. Pat. Nos. 3,475,154 and 3,264,089. The use of solvents creates a vapor hazard as the products are dried and the solvent evaporation step can cause pinhole imperfections in the coatings when applied.

Polyurethane coatings as proposed in U.S. Pat. Nos. 4,711,659 and 4,969,947 require that the substrate contain a minimum quantity of reactive —$NH_2$ groups and thus are not applicable to all fertilizer compositions for which slow release properties are desirable.

An additional problem encountered with coated urea products is the reduction or loss in water insoluble nitrogen (WIN) which occurs due to abrasion encountered in modern high speed blending and bagging operations.

Urea and blended fertilizers when they are mixed and bagged must be labeled with their WIN content, and it is the responsibility of the manufacturer to assure that the value does not decrease below the labeled value during shipping and storage. Thus, a significant loss in WIN resulting from handling in modern high speed equipment can create a situation in which the fertilizer is mislabeled and subject to recall. The present invention makes it possible for fertilizer manufacturers to produce bagged particulate fertilizers that maintain their WIN content during shipping and storage.

OBJECTS

A principal object of the invention is the provision of improved plant food particles and new methods and compositions for their production.

Further objects include the provision of:

1. Particulate fertilizer products comprising a water soluble fertilizer core encased in a plurality of water insoluble, abrasion resistant coatings that give these new products special controlled release properties.
2. Unique coating compositions and methods for the production of such products that do not require use of organic solvents.
3. New coatings for particulate fertilizer products which will act to give them high water insoluble nitrogen (WIN) values and cause them to release their plant nutrients to the soil at a slow, uniform rate over an extended period of time.
4. Such coatings that can be used at low levels of add-on so fertilizers with high nutrient analysis can be attained.
5. Fertilizer coatings that can readily be applied to fertilizer particles in a liquid form and become non-tacky, free flowing when reacted and cooled to ambient temperatures.
6. New coatings for fertilizers that provide high WIN values which are not significantly decreased by abrasion encountered in shipping, mixing, bagging, and storage.
7. Such coatings that do not require the presence of reactive —$NH_2$ groups in the fertilizer substrate so they can be applied to any substrate.

Other objects and further scope of applicability of the present invention will become apparent from the detailed description given herein; it should be understood however that the detailed descriptions, while indicating preferred embodiments of the invention, are given by way of illustration only, since various changes and modifications within the spirit and scope of the invention will become apparent from such descriptions.

SUMMARY OF THE INVENTION

Throughout the following descriptions of this invention and the appended claims, all parts are by weight and all percentages of component are by weight based upon the total weight of the product containing a stated component.

The objects are accomplished, in part, in accordance with the invention by the provision of new particulate fertilizer products having high attrition resistant and controlled release properties.

Such new fertilizers have a central mass of particulate fertilizer containing at least one water soluble plant nutrient surrounded by a plurality of coatings. One of the coatings is an inner coating comprising a reaction product of (A) a polyisocyanate selected from the group consisting of diphenylmethane diisocyanate, toluene diisocyanate, derivatives thereof, polymers thereof and mixtures thereof which contain about 1.5 to 3 isocyanate groups per molecule and between about 10 and 50% NCO and (B) a polyol having about 2 to 6 hydroxyl moieties and at least one alkyl moiety containing from about 10 to 22 carbon atoms wherein the ratio of NCO groups in the polyisocyanate to hydroxyl groups in the polyol forming the reaction product is between about 0.8 to 3. Another of the coatings is the outer coating and consists essentially of an organic wax having a drop melting point of between about 50° C. and 120° C.

Advantageously, the combined weight of the reaction product and the wax constitute between about 1 and 15% of the central mass and the reaction product constitutes between about 50 and 90% of such combined weight and the wax constitutes between 10 and 50% of such combined weight. The application of the urethane coating and the wax coating can be conducted so that they exist as two or more layers as opposed to a single layer of each coating.

In preferred embodiments, the polyisocyanate contains between about 2 and 2.5 isocyanate groups per molecule and the polyol contains about 2 to 3 hydroxyl moieties and about 16 to 18 carbon atoms in its alkyl moieties and the plant nutrient is selected from water soluble compounds of nitrogen, phosphorus, and potassium.

The objects are further accomplished by the provision of new methods for production of an attrition resistant, controlled release particulate fertilizer.

Such methods comprise the steps of (a) providing a quantity of fertilizer particles and heating them to a temperature above the melting point of the polyol component but not higher than about 100° C., (b) agitating the fertilizer particles such that a gentle mixing thereof is maintained, (c) adding to the agitated fertilizer particles a polyol having about 2 to 6 hydroxyl moieties and at least one alkyl moiety containing about 10 to 22 carbon atoms, (d) after the polyol component has spread uniformly, adding to the agitated fertilizer particles a polyisocyanate selected from the group consisting of diphenylmethane diisocyanate, toluene diisocyanate, derivatives thereof, polymers thereof, and mixtures thereof which contain about 1.5 to 3 isocyanate groups per molecule and between about 10 and 50% NCO, in such amount that the ratio of NCO groups in the polyisocyanate to hydroxyl groups in the polyol is between about 0.8 to 3, (e) allowing the polyisocyanate and polyol to react forming a solidified polyurethane coating on the fertilizer particles, (f) adding to the agitated, polyurethane coated fertilizer particles an organic wax having a drop melting point of between about 50° and 120° C. to produce an outer wax coating thereon, and (g) cooling with continuous agitation the coated fertilizer particles to below the melting point of the wax.

Metering of the streams of polyisocyanate and polyol onto the fertilizer particles can be continuous, but advantageously it is discontinuous with a portion only of the total amount of the two reactants being added and allowed to reach before additional portions are applied.

Successful application of the coatings of the invention to the particulate fertilizers depends on (1) fairly precise temperature control, (2) continuous non-shear movement of fertilizer particles during application of the inner urethane coatings and (3) applying the wax overcoating with a minimum of mixing followed by fairly rapid cooling.

DESCRIPTION OF THE PREFERRED EMBODIMENT

A more complete understanding of the invention can be obtained by reference to preferred embodiments of the invention which are illustrated by the following specific examples of the new products and methods of the invention. It will be apparent to those skilled in the art that the examples involve use of some materials and reagents that are commercially available from known sources, e.g., chemical supply houses, so details respecting them need not be given.

The polyisocyanate components are standard items of commerce. Toluene diisocyanate is sold under the trade names Mondur TD, TDS, and TD-80 by Mobay Corporation, and under the trade name Voranite T-80 by Dow Chemical. Pure and modified diphenylmethane diisocyanates are sold under the trade names Isonate 125M, 143 L, 181, and 240 by Dow Chemical, and under the trade name Mondur M by Mobay Chemical Co. Polymeric diphenylmethane diisocyanates are sold under the trade names Mondur MR and MRS by Mobay Chemical, and under the trade names PAPI 27, 94, 135, and 901 by Dow Chemical Co. Polymeric diphenylmethane diisocyanates are preferred.

Suitable polyols include castor oil and hydrogenated castor oil; i.e., glyceryl triricinoleate and glyceryl tri(12-hydroxystearate); glyceryl monostearate, glyceryl monopalmitate, glyceryl mono-12-hydroxy stearate, glyceryl monooleate; sorbitan monostearate, sorbitan monooleate, sorbitan monopalmitate, sorbitan trioleate, sorbitan tristearate; pentaerythritol and polypentaerythritol esters containing at least one or more acyl moieties with 10 to 22 carbon atoms and also containing 2–6 hydroxyl groups per molecule; and alkyl glycosides and polyglycosides wherein the alkyl group contains 10 to 20 carbon atoms and the number of glucose units is from 1 to 2.

In practicing the instant invention, the polyol component containing 1 or more alkyl moieties is preferably applied to the central mass of fertilizer prior to the addition of the first isocyanate component. The low interfacial tension between the alkyl moieties and the fertilizer particle surface and the low viscosity of the alkyl containing polyol component in the molten state allows this component to spread on and adhere to the particle surface producing a cohesive film; this polyol film is then reacted with the isocyanate component. Adhesion which depends on surface activity of the polyol component is superior to that resulting from the chemical reaction of the isocyanate component since (1) it is not necessary for the fertilizer particles to contain reactive groups for adhesion of the coating material, and (2) only a very minute portion of the reactive groups in the fertilizer particles containing them are actually exposed on the surface, and these reactive groups are in a solid phase which does not readily react with the isocyanate component.

Preferred polyols are castor oil, and especially, hydrogenated castor oil. They are standard items of commerce, and are sold by CasChem Inc. as Castor Oil and Castor Wax.

Hydrogenated castor oil is sold by Union Camp Corp under the trade name Cenwax G.

The ratio of NCO groups in the polyisocyanate component to the hydroxyl groups in the polyol component is between about 0.8 and 3, and preferably between 1 and 2.

The level of urethane coating applied is a function of the slow release properties desired, and can be from about 1% to 15%, based on the weight of the fertilizer particles.

The organic wax used to overcoat the urethane compostion is chosen from those which have drop melting points between about 50° and 120° C. and are non-tacky at temperatures below about 40° C.

Suitable waxes include paraffins; vegetable waxes, e.g., montan and carnuba waxes; triglycerides; microcrystaline waxes; olefins; and polyethylene. A preferred wax is $C_{30+}$ alpha olefin, which is available from Chevron Chemicals. This is a synthetic wax made by the polymerization of the ethylene. Such waxes advantageously used in the invention are the residues from removing most of the polyethylenes up to about 28 carbon atoms. A typical composition for such a wax is described by the size of the hydrocarbon wax molecules and the position of the olefin moiety. Waxes most useful in this invention have 3 to 30% $C_{24-28}$ hydrocarbons, 60 to 95% $C_{30-56}$ hydrocarbons and 0 to 20% $C_{58}$ and higher hydrocarbons. They consist of 0.5% to 2% paraffins (with no unsaturation), 30–40% hydrocarbons with vinylidiene double bonds and 50–55% hydrocarbons with alpha double bonds. The congealing point is about 70° C.

The level of wax overcoat applied is from about 0.5% to about 5%, preferably from about 1% to 2.5%, based on the weight of the fertilizer particles.

The inner urethane coating is applied to the fertilizer prills or granules heated to a temperature between about 60° and 105° C. The particles are kept in continuous low shear, low impact, motion relative to each other by mixing apparatus. Suitable mixing methods include fluid bed, rotating drum, pan pelletizer, and others which can provide a continuous, low shear motion.

The two components of the urethane coating are added in separate streams to the agitated particles. The temperature at which they are added is not important to the cure, as the amount of the coating is so small that it does not significantly affect the temperature of the preheated particles. Hydrogenated castor oil melts at 85° C. and must be added in the molten state. A preferred method of addition of the polyol and isocyanate components is stepwise. Thus, first about 50% of the polyol component is added to the particulate substrate, second within about 1 to 30 seconds about 10–30% of the isocyannate component is added, third within about 2–3 minutes of the second step another 10–30% of the isocyannate component is added, fourth within about 1–2 minutes of the third step the remainder of the polyol component is added and this is followed by fifth and sixth steps that are essentially repeats of the second and third steps.

The temperature and agitation are maintained for a sufficient period to cause the uretheane resin to cure.

When the urethane coated particles are free flowing, the molten wax is added and heat and agitation continued until the wax has formed a contiguous film on the particles, about 0.5 to 2 minutes. The particles are cooled with agitation to prevent agglomeration until the temperature has reached a level at which the wax coating is non-tacky and the urea particles are free flowing.

EXAMPLE 1

In this and the following examples, a 14 inch diameter pan granulator is used to agitate urea granules and mix them with selected reagents. The pan is positioned at an angle of about 10°–20° to the horizontal.

Four 3" telfon coated baffles are positioned in about ½ of the pan area so that the urea granules are mixed in a plowing motion as they fall through the series of baffles. As the pan is rotated, the granules are elevated to the top where they are plowed away from the lip by the baffles. As they cascade down the pan, other baffles direct the flow in a back and forth manner. The action of the pan and baffles is such that fluid material added to the pan is spread and flows between the granules by the surface tension with the assistance of the baffles.

The positioning of the baffles is such that the granules are kept as close as possible to the outer perimeter of the pan to maximize the motion. Care is exercised to prevent the granules from being sheared or crushed between the baffles and the pan. The following reagents are used to produce a particulate fertilizer having a central mass of urea granules:

1.25% polymeric diphenylmethane diisocyanate (DOW PAPI 94)

1.75% hydrogenated castor oil (Union Camp Cenwax G)

1.5% hydrocarbon wax (Gulftene 30+)

Successful application of the isocyanate and castor oil reagents depends on getting them adequately spread onto the granules before the cure takes place, which is a rather short period of time at the melt temperature of the castor oil. This is accomplished preferably by adding the molten castor oil component first followed immediately by the isocyanate component.

The urea granules of U.S. Standard Mesh Screen Size −10+18 are charged into the pan at 80° C. One half of the molten hydrogenated castor oil followed by 30% of the total amount of the PAPI are applied onto the agitated granules. The reaction of the separate reagents to form a cured polyurethane coating is rapid; the granules are free flowing in about 1.5 minutes. At this point, a second addition of 20% of the PAPI is streamed onto the granules, which cures immediately. These two steps are repeated to apply the total amount of the PAPI and castor oil.

At this point, the baffles and heat are removed, the pan angle is changed to allow the granules to roll and the molten wax is added. The resulting product is cooled with an ambient temperature air stream until the wax congeals at which time the granules are discharged from the pan, but gentle stirring of them is continued until the product cools to less than 40° C.

EXAMPLE 2

The following reagents are used to produce a particulate fertilizer having a central mass of urea granules using the pan granulator of Example 1:

1.2% polymeric diphenylmethane diisocyanate (Dow PAPI 94)

1.3% glycerol monostearate 2.5% $C30^+$ alpha olefin wax

The application of these reagents is like that of Example 1, but the PAPI and monostearate are applied in one step rather than in portioned steps as in Example 1.

EXAMPLE 3

The procedure of Example 2 is repeated with the following coating reagents:

0.75% polymeric diphenylmethane diisocyanate (Dow PAPI 94)

1.75% hydrogenated castor oil 2.5% hydrogenated tallow glyceride wax

EXAMPLE 4

The following reagents are used to produce a particulate fertilizer having a central mass of urea granules using the pan granulator of Example 1:

1.5% polymeric diphenylmethane diisocyanate (Dow PAPI 94)

3.5% hydrogenated castor oil

The granules preheated to 80° C. are coated by applying one-half of the isocyanate reagent to the granules agitated as in Example 1 and allowing this reagent to react with the urea before adding one-half of the hydrogenated castor oil. After allowing for the reaction between the isocyanate and the hydrogenated castor oil, the two additions are repeated. The coated particles are then discharged from the pan and allowed to cool to ambient temperature.

EXAMPLE 5

The following reagents are used to produce a particulate fertilizer having a central mass of urea granules using the pan granulator of Example 1:

1.5% polymeric diphenlymethane diisocyanate (Dow PAPI 94)

1.7% hydrogenated castor oil 2.5% 30$^+$ alpha olefin wax.

In a first step, one-half of the isocyanate and all of the hydrogenated castor oil are applied to the agitated urea particles and allowed to react and cure. In a second step, the remaining one-half of the isocyanate component is added and allowed to cool. Thereafter, the wax is applied and cooled as disclosed in Example 1.

EXAMPLE 6

The following reagents are used to produce a particulate fertilizer having a central mass of urea granules using the pan granulator of Example 1:

1.5% polymeric diphenylmethane diisocyanate (Dow PAPI 94)

1.7% hydrogenated castor oil 2.5% C30$^+$ alpha olefin wax.

In a first step, 30% of the isocyanate and 50% of the castor oil are applied to the agitated granules and allowed to react and cure. In a second step, 20% of the isocyanate is added and allowed to react. In third and fourth steps, the first and second steps are repeated. Thereafter the wax is applied and cooled as disclosed in Example 1.

EXAMPLE 7

The water insoluble nitrogen (WIN) of the particulate fertilizer products of Examples 1–6 are tested by adding 10 g of the test product to 90 g distilled water contained in a polyethylene bottle. After gently swirling the bottle, it is capped and allowed to stand undisturbed at the temperature of the test for 24 hours. Then the bottle is gently swirled again and the urea dissolved is determined from the refractive index of solution pipetted from the bottle. The dissolved urea is again determined after the bottle and contents have stood at the temperature of the test for 4 days and 7 days. The results of tests run at 25° C. are reported in Table 1 as percent WIN, obtained by subtracting the dissolved portion of the granules from the initial portion to determine the remaining undissolved portion.

TABLE 1

| Product | % WIN | | |
|---|---|---|---|
| | 1 day | 4 days | 7 days |
| Example 1 | 100 | 95 | 84 |
| Example 2 | 79 | 0 | |
| Example 3 | 49 | 0 | |
| Example 4 | 40 | 0 | |
| Example 5 | 86 | 53 | 36 |
| Example 6 | 98 | 85 | 73 |

The product of Example 1 in which the components are added according to the teaching of this invention is shown to be superior to that of Example 4 in which the isocyanate component is added first and no wax second coating is used. The product of Example 3 is prepared from a ratio of NCO to hydroxyls of less than 1, which is a less preferred composition. The product of Example 6, in which the urethane components are added in two stages, is superior to that of Example 5 in which the urethane components are added in one stage.

EXAMPLE 8

The urethane compositions of this invention were applied to other fertilizer substrates, by the procedure of Example 1, except that the number of urethane applications was varied, as indicated in Table 2. The release rate was determined as described in Example 7 and the results are also shown in the Table.

TABLE 2

| Substrate | % Urethane | % Wax | No. of Ureth. Applications | % WIN | | |
|---|---|---|---|---|---|---|
| | | | | 1 day | 4 days | 7 days |
| $(NH_4)_2SO_4$ | 4.5 | 1.5 | 3 | 89 | 61 | 54 |
| $(NH_4)_2SO_4$ | 6.0 | 1.5 | 4 | 97 | 92 | 88 |
| $K_2SO_4$ | 3.0 | 1.9 | 2 | 84 | 30 | 18 |
| $K_2SO_4$ | 6.0 | 1.7 | 2 | 79 | 50 | 33 |
| $K_2SO_4$ | 6.0 | 1.8 | 4 | 86 | 58 | 44 |
| $K_2SO_4$ | 9.0 | 1.6 | 3 | 95 | 87 | 78 |
| $K_2SO_4$ | 12.0 | 1.6 | 4 | 100 | 97 | 93 |

The fertilizer particles of this invention can also be produced in a continuous process in a rotating drum. The urethane components are drizzled into the drum at a position of maximum motion of the bed of fertilizer particles. The process is continuous with the fertilizer particles moving from one end of the drum to the other end in about 12 minutes. The reagent additions are spaced as the urea particles move through the drum. Typically, the first polyol addition is about 1–2 minutes after the urea has entered the drum and the first isocyanate addition is about 30 seconds later. The second polyol addition is about 1–2 minutes after the second isocyanate addition and the third and fourth isocyanate additions are timed like the first and second. The molten wax can be applied in the same drum, 1–2 minutes after the final isocyanate addition, or can be applied in a second drum. The coated fertilizer is discharged to a fluid bed to cool to below the melting point of the wax.

The embodiments of the invention in which an exclusive property or privilege is claimed are defined as follows:

1. An attrition resistant, controlled release fertilizer having a central mass of particulate fertilizer containing at least one water soluble plant nutrient surrounded by a plurality of coatings, one of said coatings being an inner coating consisting essentially of a reaction product of A. a polyisocyanate selected from the group consisting of diphenylmethane diisocyanate, toluene diisocyanate, derivatives thereof, polymers thereof and mixtures thereof which contain about 1.5 to 3 isocyanate groups per molecule and between about 10 and 50% NCO, and B. a polyol having about 2 to 6 hydroxyl moieties and at least one aliphatic moiety containing about 10 to 22 carbon atoms, wherein the ratio of NCO groups in said polyisocyanate to hydroxyl groups in said polyol forming said reaction product is between about 0.8 to 3;

and another of said coatings being the outer coating consisting essentially of an organic wax having a drop melting point of between about 50° and 120° C.

2. The fertilizer of claim 1 wherein the polyisocyanate contains between about 2 and 2.5 isocyanate groups per molecule and said polyol contains about 2 to 3 hydroxyl moieties and about 16 to 18 carbon atoms in said aliphatic moieties.

3. The fertilizer of claim 1 wherein said plant nutrient is selected from the group consisting of water soluble compounds of nitrogen, phosphorus and potassium.

4. The fertilizer of claim 3 wherein said plant nutrient is urea.

5. The fertilizer of claim 1 wherein the combined weight of said reaction product and said wax constitute between about 1 and 15% by weight of the weight of said central mass.

6. The fertilizer of claim 5 wherein said reaction product constitutes between about 50 and 90% by weight of said combined weight and said wax constitutes between about 10 and 50% by weight of said combined weight.

7. The fertilizer of claim 1 wherein said polyisocyanate is polymeric diphenylmethane diisocyanate and said polyol is hydrogenated castor oil.

8. The fertilizer of claim 7 wherein said wax is a $C_{30+}$ alpha olefin.

9. The fertilizer of claim 8 wherein said plant nutrient is selected from granular urea and prilled urea.

10. A method for production of an attrition resistant, controlled release particulate fertilizer which consists essentially of: providing a quantity of fertilizer particles and heating them to a temperature above the melting point of the polyol component but not higher than about 100° C., agitating said fertilizer particles such that a gentle mixing thereof is maintained, adding to said agitated fertilizer particles a polyol having about 2 to 6 hydroxyl moieties and at least one aliphatic moiety containing about 10 to 22 carbon atoms in such amount that the ratio of NCO groups in said polyisocyanate to hydroxyl groups in said polyol is between about 0.8 to 3, after the polyol component has spread uniformly, adding to said agitated fertilizer particles a polyisocyanate selected from the group consisting of diphenylmethane diisocyanate, toluene diisocyanate, derivatives thereof, polymers thereof and mixtures thereof which contain about 1.5 to 3 isocyanate groups per molecule and between about 10 and 50% NCO, allowing the polyisocyanate and polyol to react forming a solidified polyurethane coating on said fertilizer particles, adding to said agitated, polyurethane coated fertilizer particles an organic wax having a drop melting point of between about 50° and 120° C. to produce an outer wax coating thereon, and thereafter cooling with continuous agitation said coated fertilizer particles to below the melting point of the wax.

11. The method of claim 10 wherein said additions of polyisocyanate and polyol are continuous.

12. The method of claim 10 wherein said additions of polyisocyanate and polyol are discontinuous.

13. The method of claim 10 wherein the combined amount of said polyisocyanate, polyol and wax is between about 1 and 15% by weight of the weight of said fertilizer particles.

14. The method of claim 13 wherein the combined amount of said polyisocyanate, polyol and wax is between about 1 and 10% by weight of the weight of said fertilizer particles.

15. The method of claim 14 wherein about 50% of the total of said polyol and about 30% of said polyisocyanate are streamed simultaneously onto said agitated fertilizer particles and allowed to react, then a second 20% of said polyisocyanate is streamed onto said fertilizer particles and after about 1 to 2 minutes the same split streaming operation is repeated with the remainder of said polyol and polyisocyanate.

16. The method of claim 10 wherein said polyisocyanate is polymeric diphenylmethane diisocyanate, said polyol is hydrogenated castor oil and said wax is a $C30^+$ alpha olefin.

17. The method of claim 16 wherein the amount said polymeric diphenylmethane diisocyanate, hydrogenated castor oil and $C_{30+}$ alpha olefin added to said fertilizer particles each constitutes between about 1 to 3% by weight of the weight of said fertilizer particles.

18. An attrition resistant, controlled release fertilizer prepared by the method of providing a quantity of fertilizer particles and heating them to a temperature above the melting point of the polyol component but not higher than about 100° C., agitating said fertilizer particles such that a gentle mixing thereof is maintained, adding to said agitated fertilizer particles a polyol having about 2 to 6 hydroxyl moieties and at least one aliphatic moiety containing about 10 to 22 carbon atoms in such amount that the ratio of NCO groups in said polyisocyanate to hydroxyl groups in said polyol is between about 0.8 to 3, after the polyol component has spread uniformly, adding to said agitated fertilizer particles a polyisocyanate selected from the group consisting of diphenylmethane diisocyanate, toluene diisocyanate, derivatives thereof, polymers thereof and mixtures thereof which contain about 1.5 to 3 isocyanate groups per molecule and between about 10 and 50% NCO, allowing the polyisocyanate and polyol to react forming a solidified polyurethane coating on said fertilizer particles, adding to said agitated, polyurethane coated fertilizer particles an organic wax having a top melting point of between about 50° and 120° C. to produce an outer wax coating thereon, and thereafter cooling with continuous agitation said coated fertilizer particles to below the melting point of the wax.

* * * * *